(12) United States Patent
Coon et al.

(10) Patent No.: US 10,626,715 B2
(45) Date of Patent: Apr. 21, 2020

(54) DOWNHOLE COMMUNICATION DEVICE

(71) Applicant: PetroFrac Oil Tools, LLC

(72) Inventors: Robert Joe Coon, Missouri City, TX (US); Roddie R. Smith, Katy, TX (US)

(73) Assignee: PETROFRAC OIL TOOLS, LLC, Waller, TX (US)

( * ) Notice: Subject to any disclaimer, the term of this patent is extended or adjusted under 35 U.S.C. 154(b) by 182 days.

(21) Appl. No.: 15/654,865

(22) Filed: Jul. 20, 2017

(65) Prior Publication Data
US 2019/0024498 A1 Jan. 24, 2019

(51) Int. Cl.
| | | |
|---|---|---|
| *E21B 34/08* | (2006.01) | |
| *E21B 47/01* | (2012.01) | |
| *E21B 47/12* | (2012.01) | |
| *E21B 23/03* | (2006.01) | |
| *E21B 21/10* | (2006.01) | |
| *E21B 41/00* | (2006.01) | |
| *E21B 34/06* | (2006.01) | |
| *E21B 47/10* | (2012.01) | |
| *G01V 11/00* | (2006.01) | |

(52) U.S. Cl.
CPC ............ *E21B 47/01* (2013.01); *E21B 21/103* (2013.01); *E21B 23/03* (2013.01); *E21B 34/063* (2013.01); *E21B 41/00* (2013.01); *E21B 47/1025* (2013.01); *E21B 47/12* (2013.01); *E21B 47/122* (2013.01); *G01V 11/002* (2013.01)

(58) Field of Classification Search
CPC ....................................................... E21B 34/08
USPC .......................................................... 166/386
See application file for complete search history.

(56) References Cited

U.S. PATENT DOCUMENTS

| | | | | |
|---|---|---|---|---|
| 2009/0025930 A1* | 1/2009 | Iblings | ................... | E21B 19/16 166/244.1 |
| 2014/0216754 A1* | 8/2014 | Richard | .................. | E21B 43/08 166/373 |
| 2016/0208575 A1* | 7/2016 | Bellavance | ........... | E21B 34/063 |
| 2016/0251937 A1* | 9/2016 | Fripp | ..................... | E21B 43/12 166/373 |

* cited by examiner

*Primary Examiner* — Taras P Bemko
(74) *Attorney, Agent, or Firm* — Nolte Intellectual Property Law Group

(57) ABSTRACT

A downhole communication tool is provided. The downhole communication tool may include a cylindrical housing, a plurality of ridges, and a plurality of flow control assemblies. The cylindrical housing may have an inner surface, a first end portion, and a second end portion. The inner surface may define a flowbore extending axially between the first and second end portions. The plurality of ridges may extend radially outward from the cylindrical housing between the first and second end portions. Each ridge may have a ridge outer surface and define one or more ports that extend radially between the flowbore and the ridge outer surface. Each flow control assembly may be mounted about a respective port of the one or more ports and include a dissolvable seal member extending across the respective port. Each dissolvable seal member may be configured to prevent fluid communication between the flowbore and a subterranean formation.

20 Claims, 8 Drawing Sheets

DOWNHOLE COMMUNICATION DEVICE

CROSS-REFERENCE TO RELATED APPLICATIONS

This application claims the benefit of U.S. Provisional Patent Application Ser. No. 62/366,165, filed on Jul. 25, 2016. The patent application identified above is hereby incorporated by reference in its entirety into the present application to the extent consistent with the present application.

BACKGROUND

During the completion process of a hydrocarbon-producing well in a subterranean formation, a conduit, such as a casing string, may be run into the wellbore to a predetermined depth and, in some instances, cemented in place to secure the casing string. Various "zones" in the subterranean formation may be isolated via the placement of one or more packers, which may also aid in securing the casing string and any completion equipment, e.g., fracturing equipment, in place in the wellbore. Following the placement and securing of the casing string and any completion equipment in the wellbore, a "pressure test" is typically performed to ensure that a leak or hole has not developed during the placement of the casing string and completion equipment.

Generally, a pressure test is conducted by pumping a fluid into a flowbore of the casing string, such that a predetermined pressure, typically related to the rated casing pressure, is applied to the casing string and completion equipment and maintained to ensure that a hole or leak does not exist in either. To do so, the casing string is configured such that no fluid passages out of the casing string are provided; thus, no ports or openings of the completion equipment, in addition to any other potential routes of fluid communication, may be open or available. After the pressure test is completed, further completion or production of the hydrocarbon-producing well may commence.

Accordingly, in order to either retrieve hydrocarbons and other fluids from the subterranean formation or to stimulate the subterranean formation, for example, via fracturing, one or more flow paths may be created to provide communication between the flowbore and the wellbore or subterranean formation, or both, through the casing string. One method of providing such flow paths includes the utilization of a perforating gun. In such a method, a perforating gun, typically including a string of shaped charges, is run down to the desired depth on, for example, E-line, coil tubing, or slickline. The shaped charges are detonated, thereby creating perforations in the casing string and hence the flow paths between the subterranean formation, wellbore, and the flowbore. However, one disadvantage of perforating is "skin damage," where debris from the perforations may hinder productivity of the hydrocarbon-producing well. Another disadvantage of perforating is the cost and inefficiency of having to make a separate trip to run the perforating gun downhole.

Accordingly, in an effort to reduce the number of trips, another method of providing such flow paths includes the utilization of a pressure activated tool, such as a differential valve, in the casing string. Generally, the differential valve is designed to open, creating such flow paths, once a threshold pressure is reached; however, the differential valves generally may often be inaccurate as to the pressure at which they open and such valves also do not allow for closing once they have been opened. Thus, once a pressure test has been performed at or near the threshold pressure, the well will be open, thereby impairing or potentially eliminating the ability to control the wellbore, thereby posing various risks, such as blow-outs or the loss of hydrocarbons.

What is needed, then, is a downhole completion tool capable of undergoing a pressure test and subsequently providing flow paths for production or stimulation fluids while maintaining wellbore control after the pressure test is completed.

SUMMARY

Embodiments of this disclosure may provide a downhole communication tool. The downhole communication tool may include a cylindrical housing, a plurality of ridges, and a plurality of flow control assemblies. The cylindrical housing may have an inner surface, a first end portion, and a second end portion. The inner surface may define a flowbore extending axially between the first end portion and the second end portion. The plurality of ridges may extend radially outward from the cylindrical housing between the first end portion and the second end portion. Each ridge of the plurality of ridges may have a ridge outer surface and define one or more ports that extend radially between the flowbore and the ridge outer surface. Each flow control assembly of the plurality of flow control assemblies may be mounted about a respective port of the one or more ports and include a dissolvable seal member extending across the respective port. Each dissolvable seal member may be configured to prevent fluid communication between the flowbore and a subterranean formation.

Embodiments of the disclosure may further provide a casing string. The casing string may include a plurality of tubular members, a first sub component, and a downhole communication tool. The first sub component may be coupled to a tubular member of the plurality of tubular members. The downhole communication tool may include a cylindrical housing, a plurality of ridges, and a plurality of flow control assemblies. The cylindrical housing may have an inner surface, a first end portion coupled to the first sub component, and a second end portion. The inner surface may define a flowbore extending axially between the first end portion and the second end portion. The plurality of ridges may extend radially outward from the cylindrical housing between the first end portion and the second end portion. Each ridge of the plurality of ridges may have a ridge outer surface and define one or more ports that extend radially between the flowbore and the ridge outer surface. Each flow control assembly of the plurality of flow control assemblies may be mounted about a respective port of the one or more ports and include a dissolvable seal member extending across the respective port. Each dissolvable seal member may be configured to prevent fluid communication between the flowbore and a subterranean formation.

Embodiments of the disclosure may further provide a method of pressure testing a casing string. The method may include installing a downhole communication tool between a first sub component and a second sub component of the casing string. The method may further include flowing a test fluid into the casing string and a flowbore of the downhole communication tool. The method may also include pressurizing the test fluid to perform a pressure test. The method may further include dissolving a plurality of seal members that each extend across a respective port of a plurality of ports of the downhole communication tool to form a plurality of flow paths extending through the plurality of ports of the downhole communication tool, wherein the flow paths allow fluid communication between the flowbore of the downhole communication tool and a subterranean formation.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
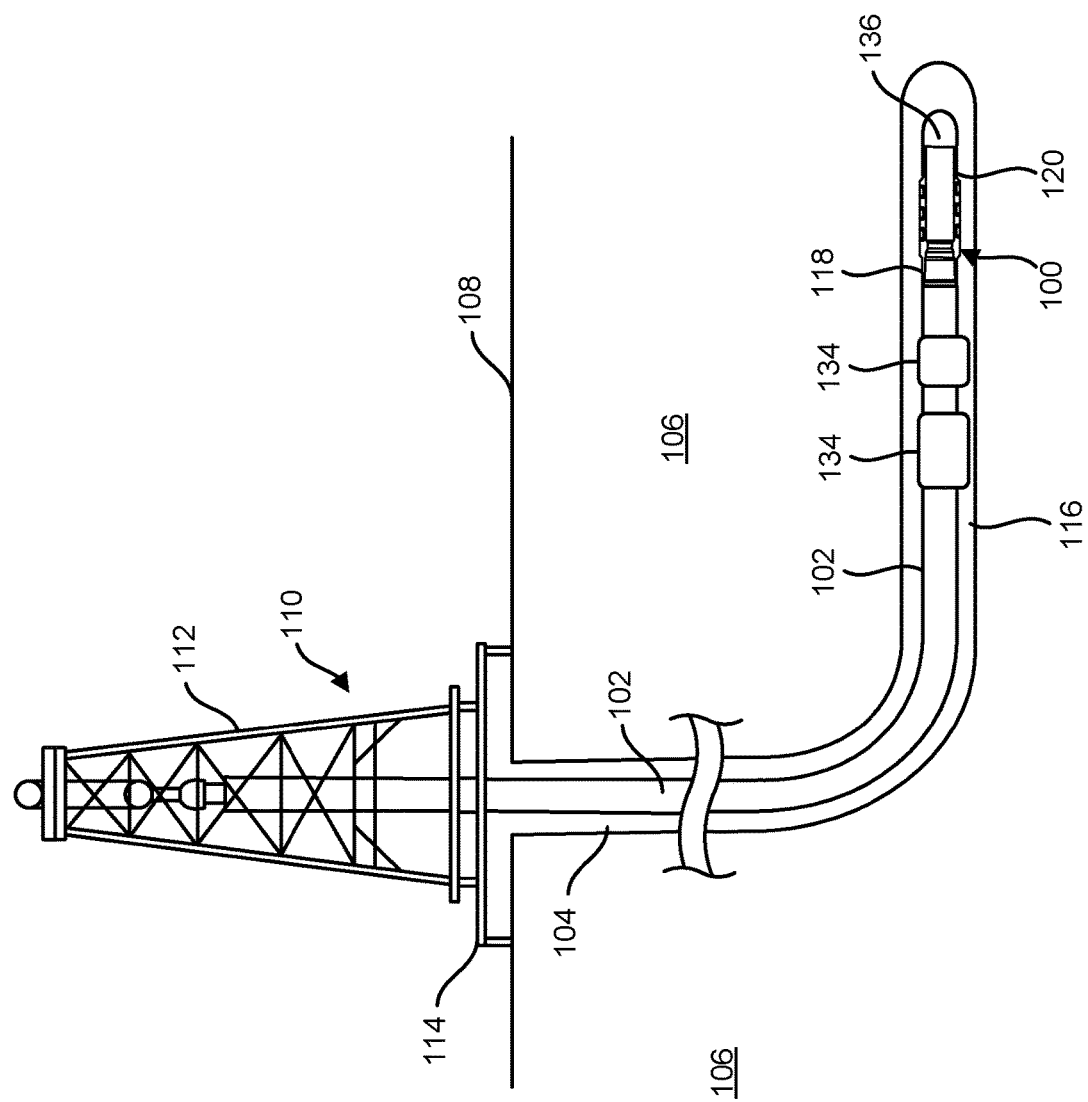
FIG. 1 illustrates a cutaway view of an exemplary downhole tool coupled to an end of a casing string disposed in a wellbore formed in a subterranean formation, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Unless otherwise specified, use of the terms "up," "upper," "upward," "uphole," "upstream," or other like terms shall be construed as generally toward the surface of the formation or the surface of a body of water; likewise, use of "down," "lower," "downward," "downhole," "downstream," or other like terms shall be construed as generally away from the surface of the formation or the surface of a body of water, regardless of the wellbore orientation. Use of any one or more of the foregoing terms shall not be construed as denoting positions along a perfectly vertical axis.

Turning now to the Figures, FIG. 1 illustrates a cutaway view of an exemplary downhole tool 100 coupled to an end of a casing string 102 disposed in a wellbore 104 formed in a subterranean formation 106, according to one or more embodiments disclosed. The wellbore 104 may be formed in the subterranean formation 106 via any conventional drilling means and is utilized for the retrieval of hydrocarbons therefrom. As illustrated, at least a portion of the wellbore 104 is oriented in a horizontal direction in the subterranean formation 106; however, embodiments in which the wellbore 104 is oriented in a convention vertical direction are contemplated herein, and the depiction of the wellbore 104 in a horizontal or vertical direction is not to be construed as limiting the wellbore 104 to any particular configuration. Accordingly, in some embodiments, the wellbore 104 may extend into the subterranean formation 106 in a vertical direction, thereby having a vertical wellbore portion, and may deviate at any angle from the vertical wellbore portion, thereby having a deviated or horizontal wellbore portion. Thus, the wellbore 104 may be or include portions that may be vertical, horizontal, deviated, and/or curved.

The wellbore 104 may be in fluid communication with the surface 108 via a rig 110 and/or other associated components positioned on the surface 108 around the wellbore 104. The rig 110 may be a drilling rig or a workover rig and may include a derrick 112 and a rig floor 114, through which the casing string 102 is positioned within the wellbore 104. As positioned in the wellbore 104, the casing string 102 and the wellbore 104 may define an annulus 116 therebetween. In an exemplary embodiment, the casing string 102 may include the downhole tool 100 coupled to a first sub component 118 and a second sub component 120 of the casing string 102. The downhole tool 100 may be delivered to a predetermined depth and positioned in the wellbore 104 via the rig 110 to perform in part a particular servicing operation including, for example, fracturing the subterranean formation 106, expanding or extending a flow path therethrough, and/or producing hydrocarbons from the subterranean formation 106. In at least one embodiment, the casing string 102 may be secured into position in the subterranean formation 106 using cement. In another embodiment, the wellbore 104 may be partially cased and cemented such that a portion of the wellbore 104 is uncemented.

The rig 110 may be a conventional drilling or workover rig and may utilize a motor-driven winch and other associated equipment for lowering the casing string 102 and the downhole tool 100 to the desired depth. Although the rig 110 is depicted in FIG. 1 as a stationary drilling or workover rig, it will be appreciated by one of ordinary skill in the art that mobile workover rigs, wellbore servicing units (e.g., coil tubing units), and the like may be used to lower the downhole tool 100 into the wellbore 104. Additionally, it will be understood that the downhole tool 100 may be used in both onshore and offshore environments.

As noted above, in an embodiment, the downhole tool 100 is referred to as being coupled to components of a casing string 102, e.g., first and second sub components 118, 120; however, it will be appreciated by one or ordinary skill in the art that the downhole tool 100 may be incorporated into other suitable tubular members. In at least one other embodiment, the downhole tool 100 may be incorporated into a liner. Further, the downhole tool 100 may be incorporated into a work string or like component.

Figure 2:
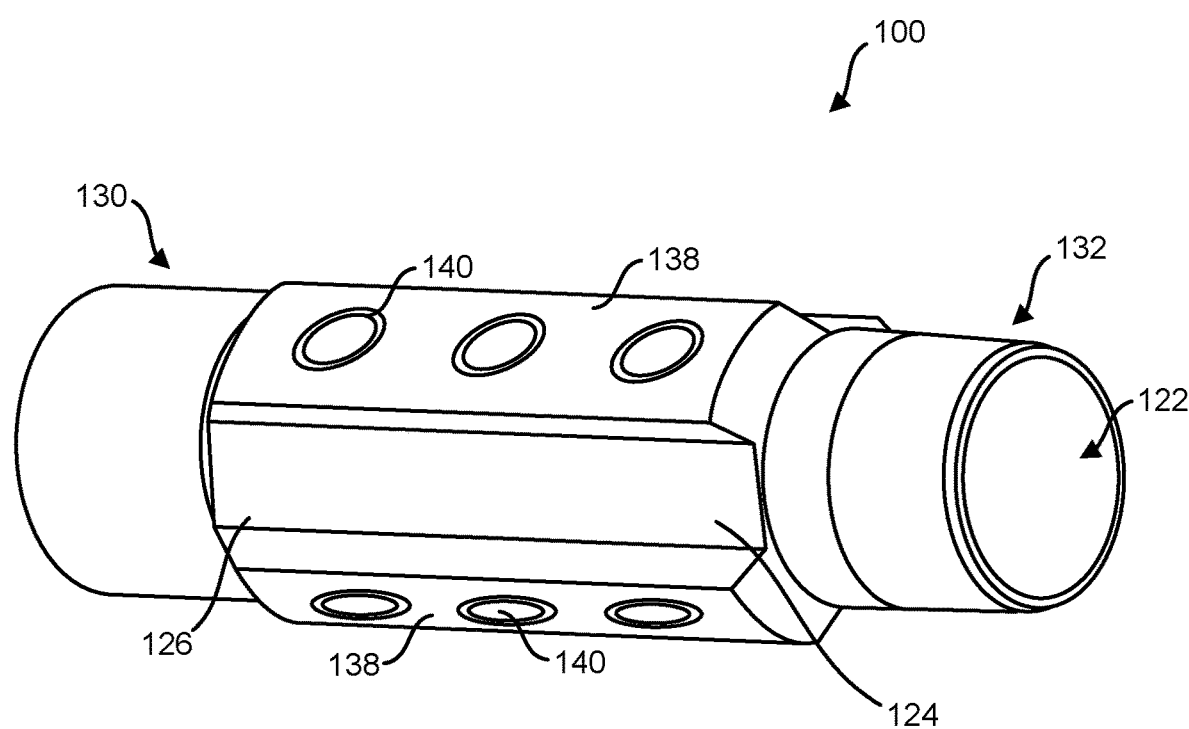
FIG. 2 illustrates an isometric view of the downhole tool of FIG. 1, according to one or more embodiments disclosed.
Figure 3A:
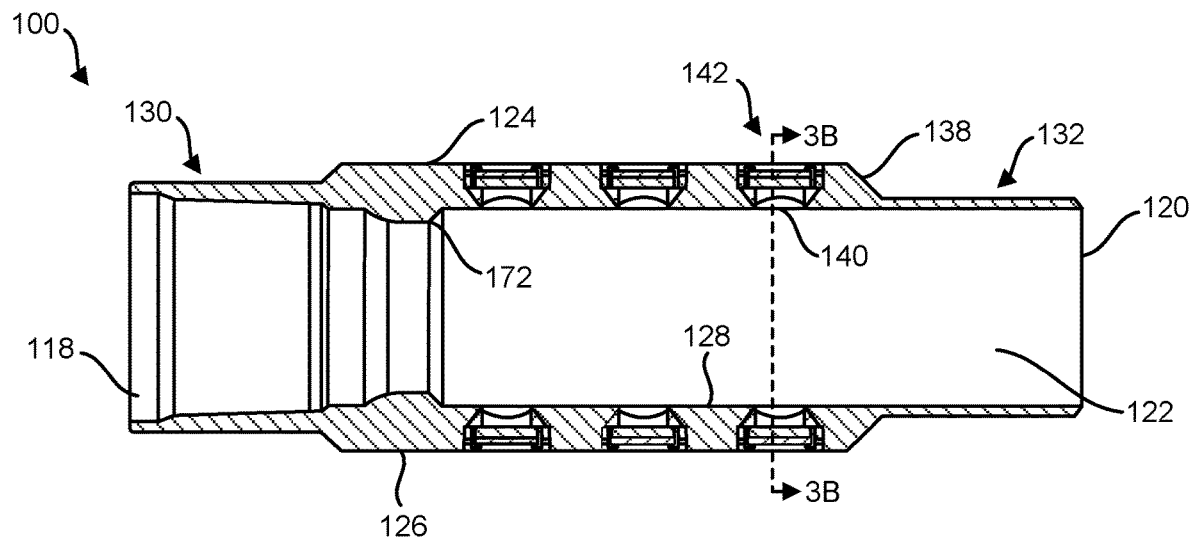
FIG. 3A illustrates a cross-section view of the downhole tool of FIG. 1, according to one or more embodiments.
Figure 3B:
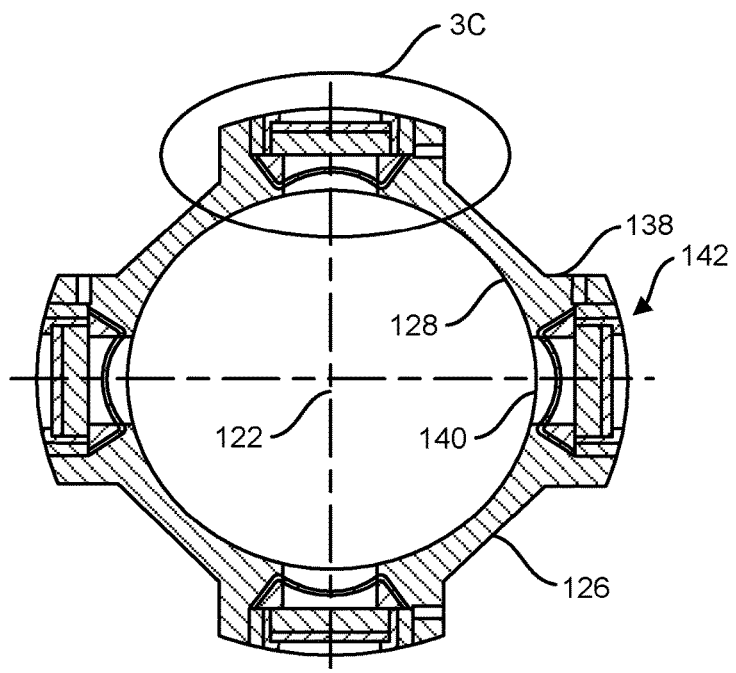
FIG. 3B illustrates a sectional view of the downhole tool of FIG. 1 taken along line 3B in FIG. 3A.
Figure 3C:
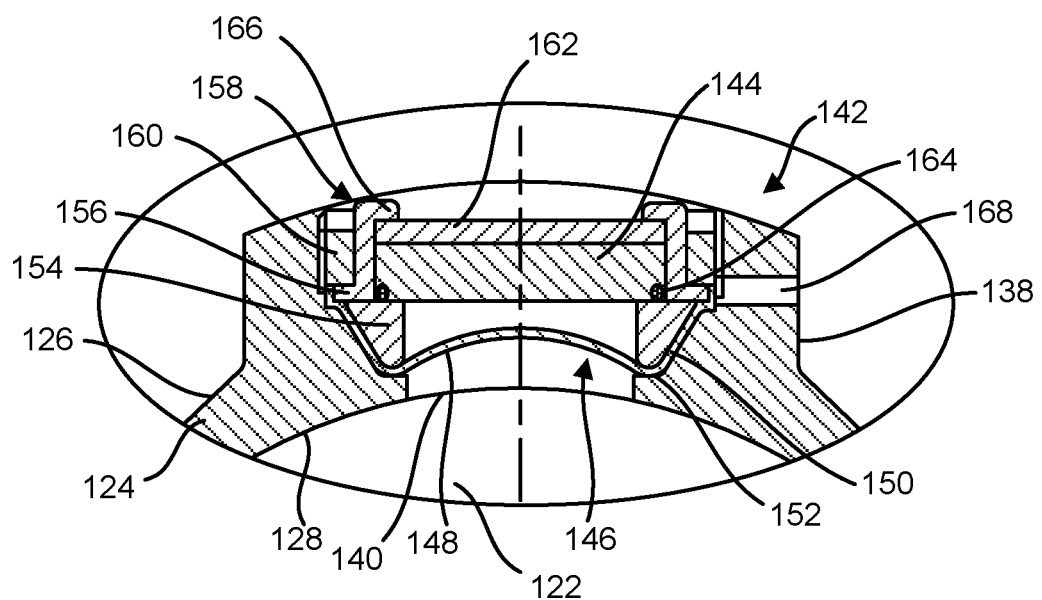
FIG. 3C illustrates an enlarged view of the encircled portion of the downhole tool labeled 3C in FIG. 3B.

Referring now to FIGS. 2 and 3A-3C with continued reference to FIG. 1, FIG. 2 illustrates an isometric view of the downhole tool 100 of FIG. 1, according to one or more embodiments disclosed. FIG. 3A is a cross-section view of the downhole tool 100 of FIG. 1, according to one or more embodiments. FIG. 3B is a sectional view of the downhole tool 100 of FIG. 1 taken along line 3B in FIG. 3A. FIG. 3C is an enlarged view of the encircled portion of the downhole tool 100 labeled 3C in FIG. 3B.

The downhole tool 100 may be configured as depicted to permit fluid communication between a combined flowbore 122 of the casing string 102 and downhole tool 100 and the subterranean formation 106 after a pressure test has been completed (i.e., a threshold pressure has been applied to the casing string 102 and the downhole tool 100 and no leaks or holes exist). The downhole tool 100 may include a generally tubular-like, e.g., cylindrical, housing 124 having an outer surface 126 and an inner surface 128, where the inner surface defines in part the flowbore 122 extending axially therethrough. The downhole tool 100 may also include a first end portion 130 and a second end portion 132 respectively coupled to the first sub component 118 and the second sub component 120 of the casing string 102, according to one or more embodiments disclosed. In forming the coupling, the first end portion 130 of the housing 124 may include inner threads configured to engage outer threads of the first sub component 118 and to further form a sealing relationship via a first sub seal component, e.g., an O-ring (not shown). Additionally, the second end portion 132 of the housing 124 may include inner threads configured to engage outer threads of the second sub component 120 and to further form a sealing relationship via a second sub seal component, e.g., an O-ring (not shown). Other coupling methods known to those of skill in the art are contemplated herein including, for example, clamps.

As shown in FIG. 1, the first sub component 118 may be further coupled to another portion of the casing string 102, a packer 134, or other associated drilling or completion component. The second sub component 120 may be further coupled to another portion of the casing string 102, the float shoe 136, or other associated drilling or completion component. In an exemplary embodiment, the downhole tool 100 may be coupled to the casing string 102 proximate the end portion or "toe" of the casing string 102.

Referring back to FIGS. 2-3C, the outer surface 126 of the downhole tool 100 may form a plurality of ridges 138 extending axially between the first end portion 130 and the second end portion 132 of the downhole tool 100. Each ridge 138 may define one or more ports 140 along the length thereof. In an exemplary embodiment, each ridge 138 defines a plurality of ports 140. Each of the ports 140 may extend from the outer surface 126 of the housing 124 to the inner surface 128 thereof and may be configured to form a flow path (170, FIGS. 5A-5O) providing fluid communication between the flowbore 122 and the subterranean formation 106 after a pressure test has been completed. Accordingly, one of ordinary skill in the art will appreciate that the number of ports 140 provided in the downhole tool 100 may be determined at least in part on desired flow properties (e.g., flow rates) of fluids into or out of the subterranean formation 106. For example, the greater the number of ports provided in the downhole tool 100, the greater the flow area provided for fluid communication, and correspondingly, the greater the flow rate of the fluids into or out of the subterranean formation 106.

Fluid communication between the flowbore 122 and the subterranean formation 106 may be regulated at each port 140 via a flow control assembly 142. A respective flow control assembly 142 may be mounted about each port 140, and, as configured in FIGS. 3A-3C, may prohibit fluid communication between the flowbore 122 and the subterranean formation 106 before and during the pressure testing of the casing string 102. To that end, as most clearly seen in FIG. 3C, each flow control assembly 142 may include a dissolvable seal member 144 extending over and sealing a respective port 140 to prohibit fluid communication between the flowbore 122 and the subterranean formation 106 before and during the pressure testing of the casing string 102. The dissolvable seal member 144 may be generally disk-shaped and may be constructed from a soluble material. In an embodiment, the soluble material may be or include polymers, such as a composite polymer. In another embodiment, the soluble material may be or include an alloy, such as a magnesium aluminum alloy. As constructed, each dissolvable seal member 144 may seal the respective port 140 until the dissolvable seal member 144 is contacted by a fluid capable of dissolving the dissolvable seal member 144.

In an exemplary embodiment, each of the flow control assemblies 142 may include an isolator member 146 configured to prohibit contact of the dissolvable seal member 144 with cement or any other associated solids or fluids flowing through the flowbore 122 during the cementing of the casing string 102 in place in the wellbore 104 and prior to the pressure testing of the casing string 102. The isolator member 146 may include a generally dome-shaped portion 148 extending over the port 140 and a flange portion 150 extending at an angle from the dome-shaped portion 148 and disposed on a shoulder 152 formed by the ridge 138. An annular seal ring 154 may be disposed on top of the flange portion 150 of the isolator member 146 and may be configured to retain the isolator member 146 in a sealing and fixed position over the port 140. The isolator member 146 may be arranged in the flow control assembly 142 radially inward from the dissolvable seal member 144 and adjacent the inner surface 128 of the housing 124 to prevent cement and other associated material flowing through the flowbore 122 during the cementing of the casing string 102 in the wellbore 104 from contacting the dissolvable seal member 144.

The isolator member 146 may be further configured to break apart, rupture, fracture, split, or otherwise fail after the cementing process of the casing string 102 is completed and the pressure testing has commenced, thus allowing a fluid capable of dissolving the dissolvable seal member 144 to contact the dissolvable seal member 144. Accordingly, in order to ensure that the isolator member 146 is disposed in a sealing manner and is not compromised prior to the completion of the cementing process, the installation of the isolator member 146 may be carried out by sandwiching the flange portion 150 of the isolator member 146 between the shoulder 152 of the ridge 138 and the annular seal ring 154 to create a seal between the shoulder 152 of the ridge 138 and the isolator member 146 to prevent contact of the cement and other associated material flowing though the flowbore 122 with the dissolvable seal member 144. By doing so, care is taken not to turn or twist the isolator member 146, thereby ensuring the structural integrity thereof. As arranged, the annular seal ring 154 may serve as a platform for the dissolvable seal member 144 to rest on in the flow control assembly 142. In an exemplary embodiment, the annular seal ring 154 is pressed against the isolator member 146 via a first flanged end portion 156 of an annular retainer 158. The annular retainer 158 may be urged radially inward and against the annular seal ring 154 via a threaded annular ring 160. The force provided by the annular retainer 158 may press the annular seal ring 154 against the isolator member 146 thereby forming a sealing relationship.

Each of the flow control assemblies 142 may further include an isolator disk 162 and an annular seal 164 as most clearly illustrated in FIG. 3C. The isolator disk 162 and the annular seal 164 may each be configured to prohibit contact of the dissolvable seal member 144 with a fluid external of the downhole tool 100 during the cementing of the casing string 102 in place in the wellbore 104 and prior to the pressure testing of the casing string 102. The isolator disk 162 may be disposed in contact with and radially outward from the dissolvable seal member 144 in the flow control assembly 142 and may be retained in position during the cementing process by a second flanged end portion 166 of the annular retainer 158. The annular seal 164, illustrated as an O-ring, may be disposed between the annular seal ring 154 and the dissolvable seal member 144 and may be configured to prohibit contact of a fluid external of the downhole tool 100 entering a fluid passageway 168 defined in the ridge 138 from contacting the dissolvable seal member 144. The fluid passageway 168 may also be utilized for leak detection purposes during assembly of the downhole tool 100 to ensure that the isolator member 146 is properly seated and in a sealing relationship with the ridge 138. A failed sealing relationship may be indicated by a test fluid (introduced into the flowbore 122 during assembly of the downhole tool 100) flowing out of the fluid passageway 168.

Figure 4A:
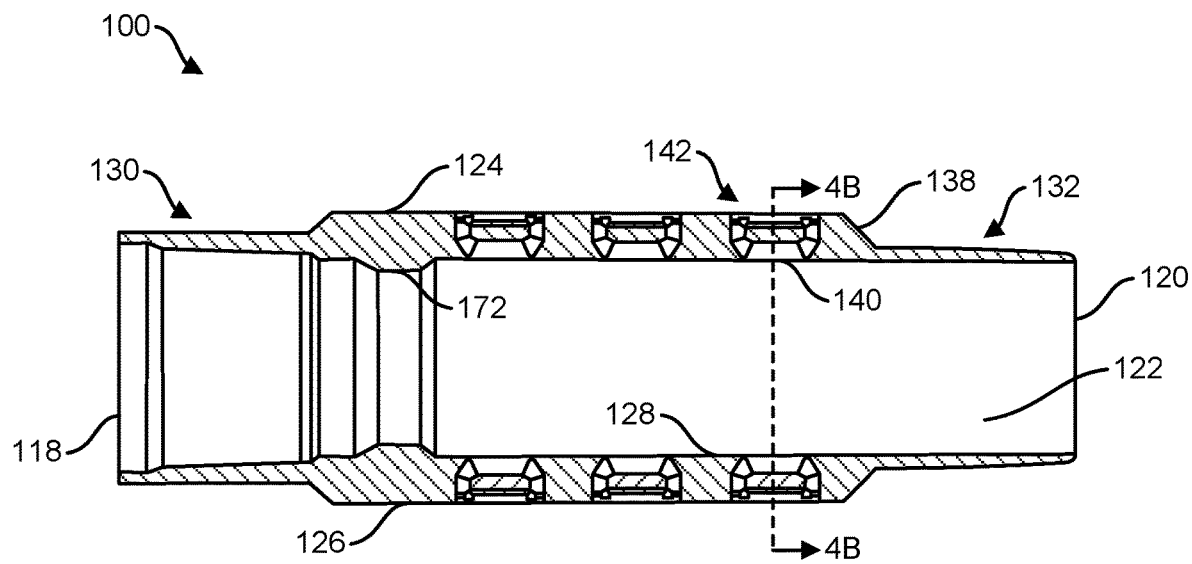
FIG. 4A illustrates a cross-section view of the downhole tool of FIG. 1, where a pressure test of the downhole tool has commenced, according to one or more embodiments, according to one or more embodiments.
Figure 4B:
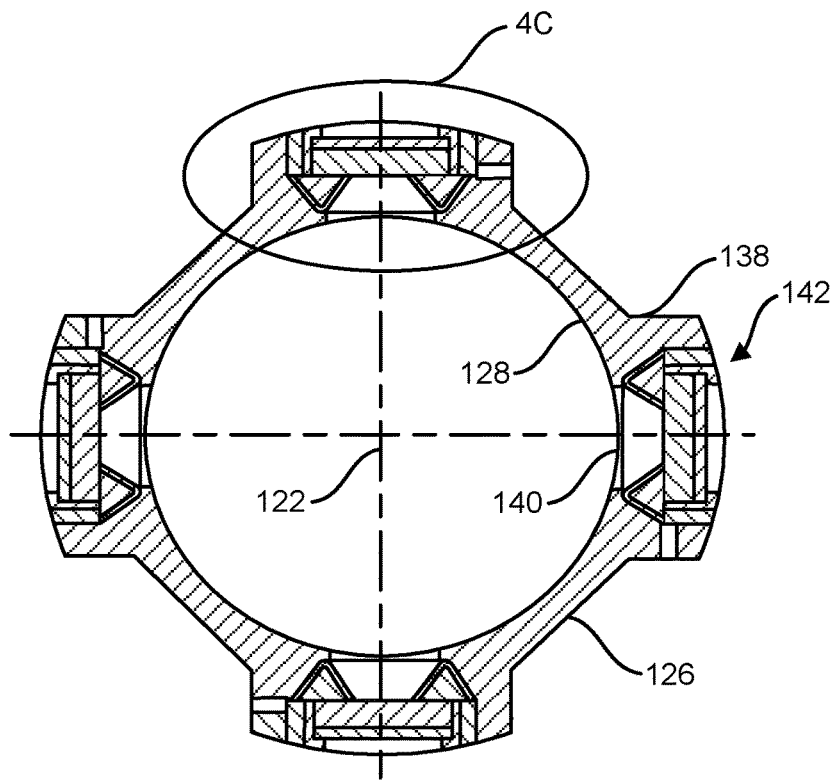
FIG. 4B illustrates a sectional view of the downhole tool of FIG. 1 taken along line 4B in FIG. 4A.
Figure 4C:
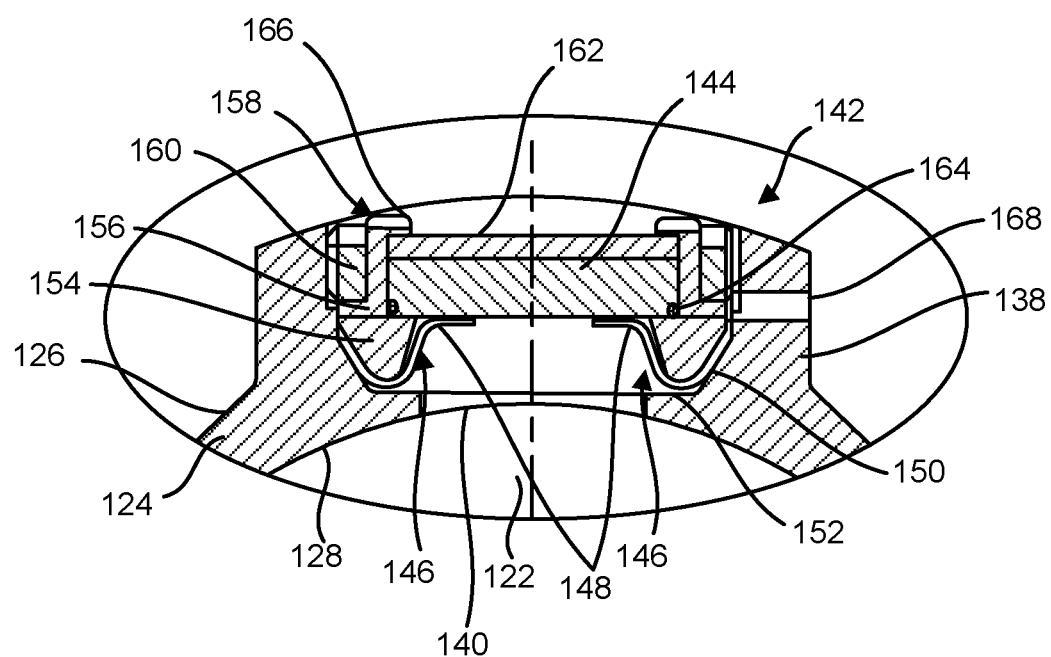
FIG. 4C illustrates an enlarged view of the encircled portion of the downhole tool labeled 4C in FIG. 4B.

Referring now to FIGS. 4A-4C with continued reference to FIGS. 1-3C, FIG. 4A illustrates a cross-section view of the downhole tool 100 of FIG. 1, where the pressure testing of the downhole tool 100 has commenced, according to one or more embodiments. FIG. 4B illustrates a sectional view of the downhole tool 100 of FIG. 1 taken along line 4B in FIG. 4A. FIG. 4C illustrates an enlarged view of the encircled portion of the downhole tool 100 labeled 4C in FIG. 4B.

After the casing string 102 and downhole tool 100 are run in the wellbore 104, a pressure test may be performed. Accordingly, a threshold pressure may be applied to the casing string 102 and downhole tool 100 as depicted in FIGS. 4A-4C, according to one or more embodiments. The threshold pressure may be substantially equal to or less than the casing test pressure or the rated casing pressure. In an exemplary embodiment, the threshold pressure is about seventy percent of the casing test pressure. In another embodiment, the threshold pressure is about seventy-five percent of the casing test pressure. In another embodiment, the threshold pressure is about eighty percent of the casing test pressure. In another embodiment, the threshold pressure is about eighty-five percent of the casing test pressure. In another embodiment, the threshold pressure is about ninety percent of the casing test pressure. In another embodiment, the threshold pressure is about ninety-five percent of the casing test pressure. One of ordinary skill in the art will appreciate that the casing test pressure may be dependent at least in part on the rated casing pressure, and accordingly, the casing test pressure chosen for the pressure test may vary depending on the casing string 102 utilized in the wellbore 104.

As most clearly seen in FIG. 4C, after completion of the cementing process and upon commencement of the pressure test, the isolator member 146 of each fluid control assembly 142 may break apart, rupture, fracture, split, or otherwise fail, thus allowing a solvent or other fluid capable of dissolving the dissolvable seal member 144 to contact the dissolvable seal member 144. In an exemplary embodiment, the fluid provided to dissolve the dissolvable seal member 144 may be a fluid provided to perform the pressure test and thus may be allowed to flow through the flowbore 122 and into each port 140 extending from the inner surface 128 of the housing 124. In an exemplary embodiment, the fluid provided to dissolve the dissolvable seal member 144 may include chlorides, such as hydrogen chloride (HCl). In another embodiment, the fluid provided to dissolve the dissolvable seal member 144 may include drilling mud. In another embodiment, the fluid provided to dissolve the dissolvable seal member 144 may include drilling water. In at least one embodiment, the fluid provided to dissolve the dissolvable seal member 144 may be a multiphase fluid and may include, for example, a liquid and a gas (e.g., water and nitrogen). In an exemplary embodiment, thermal energy may be provided to the fluid to assist in dissolving the dissolvable seal member 144.

In an exemplary embodiment, the dissolvable seal member 144 may be constructed to dissolve over a period of two days, such that each dissolvable seal member 144 may seal the respective port 140 during the entirety of the pressure test. In another embodiment, the dissolvable seal member 144 may be constructed to dissolve over a period of one day. In another embodiment, the dissolvable seal member 144 may be constructed to dissolve over a period of less than twenty-four hours. In another embodiment, the dissolvable seal member 144 may be constructed to dissolve over a period of less than twelve hours. One of ordinary skill in the art will appreciate that the construction of the dissolvable seal member 144 may be varied to dissolve according to a period of time desired for the pressure testing and specified completion of the hydrocarbon well.

Figure 5A:
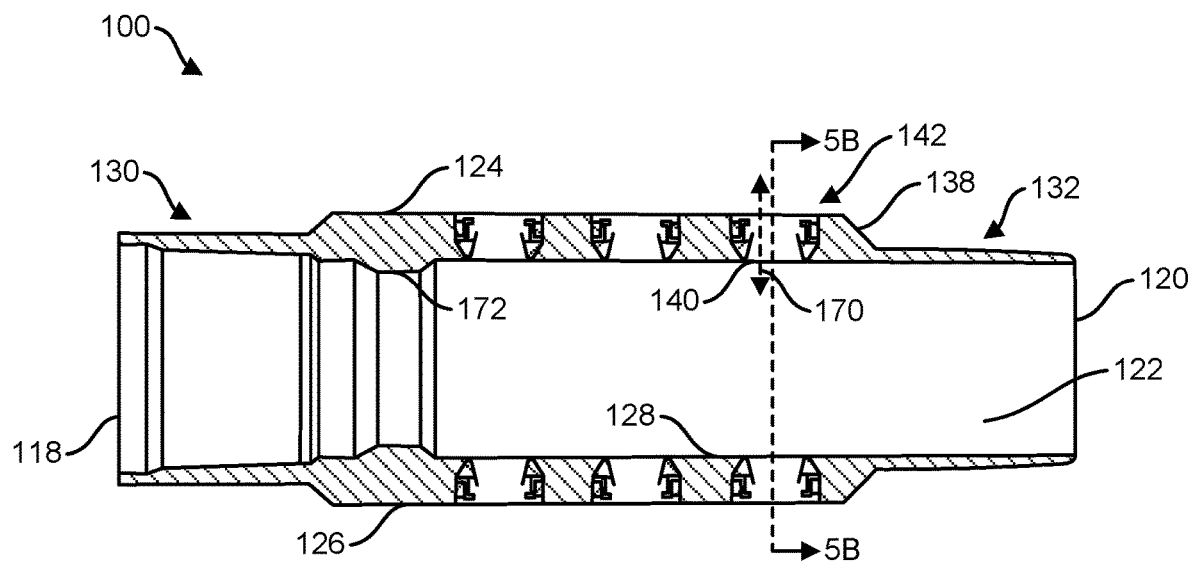
FIG. 5A illustrates a cross-section view of the downhole tool of FIG. 1, where the pressure test has been completed and a flowbore of the downhole tool may fluidly communicate with the subterranean formation, according to one or more embodiments.
Figure 5B:
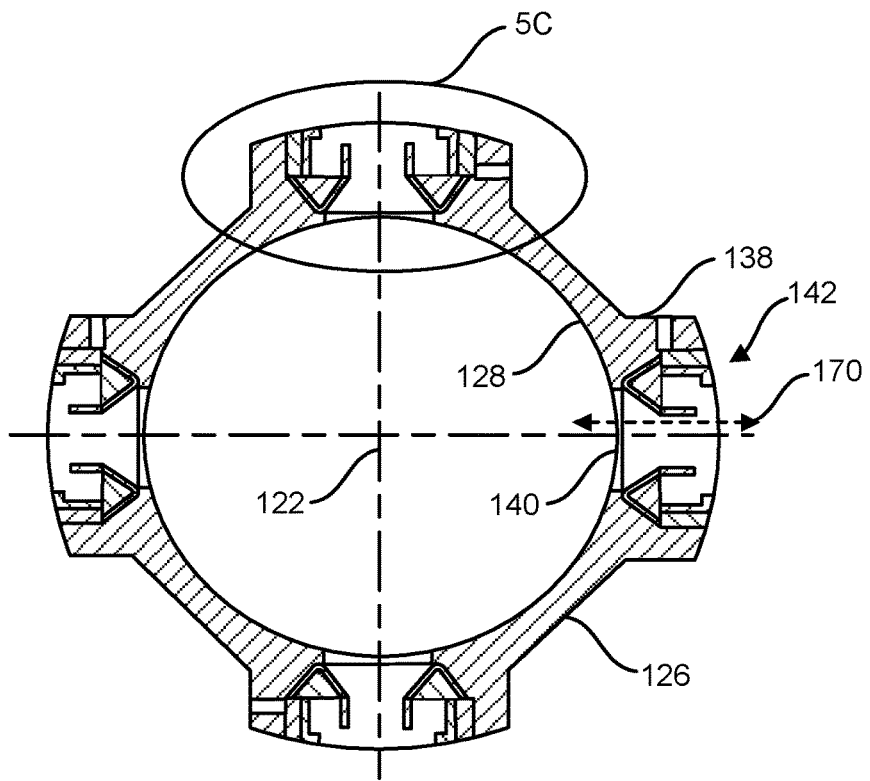
FIG. 5B illustrates a sectional view of the downhole tool of FIG. 1 taken along line 5B in FIG. 5A.
Figure 5C:
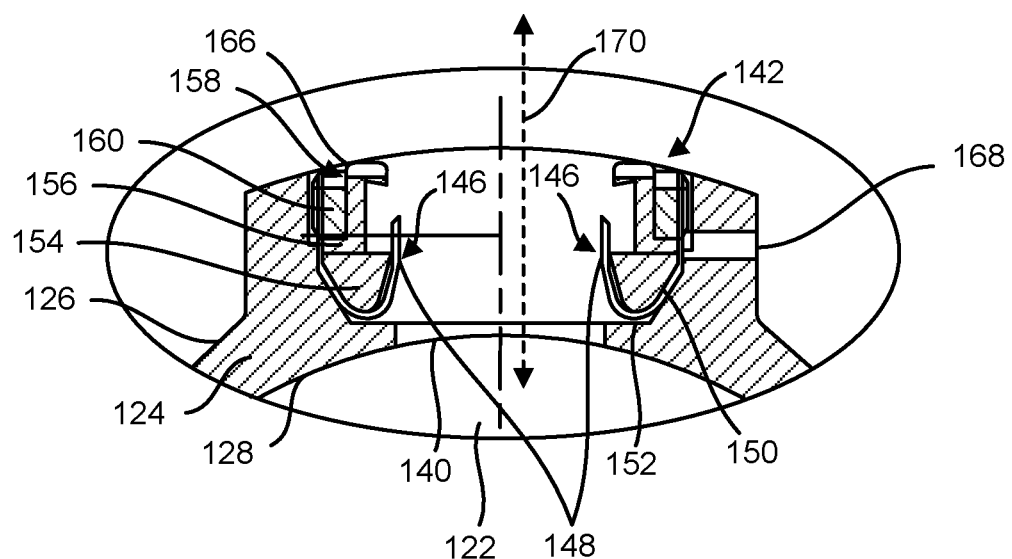
FIG. 5C illustrates an enlarged view of the encircled portion of the downhole tool labeled 5C in FIG. 5B.

Referring now to FIGS. 5A-5C with continued reference to FIGS. 1-4C, FIG. 5A illustrates a cross-section view of the downhole tool 100 of FIG. 1, where the pressure test has been completed and the flowbore 122 of the downhole tool 100 may fluidly communicate with the subterranean formation 106, according to one or more embodiments. FIG. 5B illustrates a sectional view of the downhole tool 100 of FIG. 1 taken along line 5B in FIG. 5A. FIG. 5C illustrates an enlarged view of the encircled portion of the downhole tool 100 labeled 5C in FIG. 5B.

As most clearly seen in FIG. 5C, after a period of time has elapsed from the initial contact of the fluid with the dissolvable seal member 144 during the pressure test, the dissolvable seal member 144 may substantially or completely dissolve. In addition, the isolator disk 162 and the annular seal 164 may be pushed into the cement and/or subterranean formation 106 from the fluid (or stimulation fluid and/or associated material, e.g., sand) such that a respective flow path 170 is formed in each of the ports 140 and extends between the flowbore 122 and the subterranean formation 106. Each of the flow paths 170 permits fluid communication between the flowbore 122 and the subterranean formation 106, thereby allowing for the stimulation of the subterranean formation 106 and/or the retrieval of hydrocarbons from the subterranean formation 106.

In one embodiment, the inner surface 128 of the downhole tool 100 has a restriction 172 that provides a contingency means of pressure testing the downhole tool 100 if needed. In another embodiment, the casing string 102 may include a plurality of downhole tools 100 coupled with one another in series, commonly referred to as "daisy-chained." In another embodiment, the downhole tools 100 may be separated by portions of the casing string 102. By arranging the downhole tools 100 in series along a portion of the casing string 102, multiple pressure tests may be conducted before production or stimulation of the well without further trips downhole. Thus, multiple pressure cycles may be provided in instances in which one or more pressure tests may be required.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A downhole communication tool, comprising:
   a cylindrical housing having an inner surface, a first end portion, and a second end portion, the inner surface defining a flowbore extending axially between the first end portion and the second end portion;
   a plurality of ridges extending radially outward from the cylindrical housing between the first end portion and the second end portion, each ridge of the plurality of ridges having a ridge outer surface and a ridge inner surface and defining one or more ports extending radially, through the ridge, between the flowbore and the ridge outer surface; and
   a plurality of flow control assemblies, each flow control assembly mounted about a respective port of the one or more ports and comprising:
      a dissolvable seal member extending across the respective port, the dissolvable seal member to prevent fluid communication between the flowbore and a subterranean formation;
      an isolator member disposed radially inward from the dissolvable seal member and extending over the respective port, the isolator member to prevent contact between the dissolvable seal member and fluid flowing through the flowbore;
      an annular seal ring disposed on top of a flange portion of the isolator member, the annular seal ring to retain the isolator member in a fixed position over the respective port;
      an annular retainer contacting and disposed radially outward from the annular seal ring, the annular retainer configured to hold the dissolvable seal member against the annular seal ring and to press the annular seal ring against the isolator member to form a seal; and
      an isolator disk disposed in direct contact with and radially outward from the dissolvable seal member, the isolator disk to prevent contact between the dissolvable seal member and fluid external of the downhole communication tool.

2. The downhole communication tool of claim 1, wherein the isolator member is to fracture or rupture during pressure testing of a casing string.

3. The downhole communication tool of claim 1, wherein each isolator disk is to be pushed out of the respective port to allow fluid communication between the flowbore and the subterranean formation.

4. The downhole communication tool of claim 1, further comprising a restriction extending radially inward from the inner surface and across a portion of an axial length of the cylindrical housing.

5. The downhole communication tool of claim 1, wherein the first end portion is to be coupled to a sub component of a casing string.

6. The downhole communication tool of claim 1, wherein the second end portion is to be coupled to a sub component of a casing string.

7. The downhole communication tool of claim 1, wherein the second end portion is to be coupled to a first end portion of a second downhole communication tool.

8. The downhole communication tool of claim 1, wherein each fluid control assembly further comprises a threaded annular ring disposed between an inner surface of the ridge and outer surfaces of the dissolvable seal member and the isolator disk.

9. The downhole communication tool of claim 8, wherein the annular retainer, of each flow control assembly, comprises:
   a first flanged end portion contacting and disposed radially outward from the isolator disk;
   a second flanged end portion disposed between and contacting the threaded annular ring and the flanged portion of the isolator member and disposed on top of and contacting the annular seal ring; and
   a middle portion connecting the first and second flanged end portions and disposed between and contacting the threaded annular ring and the outer surfaces of the dissolvable seal member and the isolator disk.

10. The downhole communication tool of claim 1, wherein each ridge comprises a passageway extending from the ridge outer surface to the ridge inner surface, the passageway opening to the flange portion of one of the isolator members.

11. The downhole communication tool of claim 1, wherein the isolator member, of each flow control assembly, comprises a dome portion extending over the respective port from which the flange portion extends, wherein the dome portion is concave relative to the dissolvable seal member.

12. A casing string, comprising:
    a plurality of tubular members;
    a first sub component coupled to a tubular member of the plurality of tubular members; and
    a downhole communication tool, comprising:
        a cylindrical housing having an inner surface, a first end portion coupled to the first sub component, and a second end portion, the inner surface defining a flowbore extending axially between the first end portion and the second end portion,
        a plurality of ridges extending radially outward from the cylindrical housing between the first end portion and the second end portion, each ridge of the plurality of ridges having a ridge outer surface and defining one or more ports extending radially, through the ridge, between the flowbore and the ridge outer surface, and
        a plurality of flow control assemblies, each flow control assembly mounted about a respective port of the one or more ports and comprising:
            a dissolvable seal member extending across the respective port, the dissolvable seal member to prevent fluid communication between the flowbore and a subterranean formation;
            an isolator member disposed radially inward from the dissolvable seal member and extending over the respective port, the isolator member to prevent contact between the dissolvable seal member and fluid flowing through the flowbore;
            an annular seal ring disposed on top of a flange portion of the isolator member, the annular seal ring to retain the isolator member in a fixed position over the respective port;
            an annular retainer contacting and disposed radially outward from the annular seal ring, the annular retainer to hold the dissolvable seal member against the annular seal ring and to press the annular seal ring against the isolator member to form a seal; and
            a threaded annular ring disposed between an inner surface of the ridge and an outer surface of the dissolvable seal member.

13. The casing string of claim 12, wherein the isolator member is to fracture or rupture during pressure testing of the casing string.

14. The casing string of claim 12, wherein each flow control assembly further comprises an isolator disk disposed in direct contact with and radially outward from the dissolvable seal member, the isolator disk to prevent contact between the dissolvable seal member and fluid external of the downhole communication tool.

15. The casing string of claim 14, wherein each isolator disk is to be pushed out of the respective port to allow fluid communication between the flowbore and the subterranean formation.

16. The casing string of claim 14, wherein the annular retainer, of each flow control assembly, comprises:
    a first flanged end portion contacting and disposed radially outward from the isolator disk;
    a second flanged end portion disposed between and contacting the threaded annular ring and the flanged portion of the isolator member and disposed on top of and contacting the annular seal ring; and
    a middle portion connecting the first and second flanged end portions and disposed between and contacting the threaded annular ring and outer surfaces of the dissolvable seal member and the isolator disk.

17. The casing string of claim 12, further comprising a second sub component coupled to the second end portion of the downhole communication tool.

18. The casing string of claim 12, further comprising a second downhole communication tool coupled to the second end portion of the downhole communication tool.

19. A method of pressure testing a casing string, comprising:
    installing a downhole communication tool between a first sub component and a second sub component of the casing string, the downhole communication tool comprising:
        a cylindrical housing having an inner surface, a first end portion, and a second end portion, the inner surface defining a flowbore extending axially between the first end portion and the second end portion;
        a plurality of ridges extending radially outward from the cylindrical housing between the first end portion and the second end portion, each ridge of the plurality of ridges having a ridge outer surface and defining one or more ports extending radially, through the ridge, between the flowbore and the ridge outer surface; and
        a plurality of flow control assemblies, each flow control assembly mounted about a respective port of the one or more ports and comprising:
            a dissolvable seal member extending across the respective port, the dissolvable seal member to prevent fluid communication between the flowbore and a subterranean formation;
            an isolator member disposed radially inward from the dissolvable seal member and extending over the respective port, the isolator member to prevent contact between the dissolvable seal member and fluid flowing through the flowbore;
            an annular seal ring disposed on top of a flange portion of the isolator member, the annular seal ring to retain the isolator member in a fixed position over the respective port;
            an annular retainer contacting and disposed radially outward from the annular seal ring, the annular retainer to hold the dissolvable seal member against the annular seal ring and to press the annular seal ring against the isolator member to form a seal; and
            an isolator disk disposed in direct contact with and radially outward from the dissolvable seal member, the isolator disk to prevent contact between the dissolvable seal member and fluid external of the downhole communication tool;
    flowing a test fluid into the casing string and a flowbore of the downhole communication tool;
    pressurizing the test fluid to perform a pressure test; and
    dissolving a plurality of seal members that each extend across a respective port of a plurality of ports of the downhole communication tool to form a plurality of flow paths extending through the plurality of ports of the downhole communication tool, wherein the flow paths allow fluid communication between the flowbore of the downhole communication tool and a subterranean formation.

20. The method of claim 19, further comprising fracturing or rupturing a plurality of isolator members of the downhole communication tool via the pressurized test fluid and exposing the plurality of seal members to the test fluid.

\* \* \* \* \*